United States Patent
Lee et al.

(10) Patent No.: US 9,065,536 B2
(45) Date of Patent: Jun. 23, 2015

(54) METHOD AND APPARATUS FOR REDUCING ELECTROMAGNETIC WAVES IN MOBILE DEVICE

(75) Inventors: Hanyeop Lee, Suwon-si (KR); Seungseok Oh, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 172 days.

(21) Appl. No.: 13/584,171

(22) Filed: Aug. 13, 2012

(65) Prior Publication Data

US 2013/0055005 A1    Feb. 28, 2013

(30) Foreign Application Priority Data

Aug. 22, 2011 (KR) .................... 10-2011-0083419

(51) Int. Cl.
- *H04M 1/00* (2006.01)
- *H04B 1/3827* (2015.01)
- *H04B 1/403* (2015.01)
- *H04B 15/00* (2006.01)
- *H02J 7/00* (2006.01)

(52) U.S. Cl.
CPC .............. *H04B 1/3838* (2013.01); *H04B 1/406* (2013.01); *H04B 15/005* (2013.01); *H02J 7/0093* (2013.01)

(58) Field of Classification Search
CPC ..... H04B 15/005; H04B 1/3838; H04B 1/406
USPC ........ 455/552.1, 556.1, 573, 572, 574, 343.1, 455/296, 62, 63.1
See application file for complete search history.

(56) References Cited

U.S. PATENT DOCUMENTS

| | | | |
|---|---|---|---|
| 2003/0228892 A1* | 12/2003 | Maalismaa et al. | 455/575.7 |
| 2004/0136208 A1* | 7/2004 | Agarwal et al. | 363/21.12 |
| 2007/0224940 A1* | 9/2007 | Pankinaho et al. | 455/62 |
| 2007/0262747 A1 | 11/2007 | Chen | |
| 2011/0199045 A1* | 8/2011 | Hui et al. | 320/108 |

FOREIGN PATENT DOCUMENTS

EP    2 302 756 A1    3/2011

* cited by examiner

*Primary Examiner* — Barry Taylor
(74) *Attorney, Agent, or Firm* — Jefferson IP Law, LLP

(57) ABSTRACT

A method and an apparatus for reducing electromagnetic waves in a mobile device are provided. According to the method, in a mobile device having the first and second modules with different functions, the apparatus operates the first module at the first operating frequency. If there is a request for operating the second module while the first module is operated, the apparatus changes the first operating frequency to a second operating frequency which is different from the first operating frequency, and operates the first module at the second operating frequency. The apparatus reduces a total magnitude of electromagnetic waves caused by a simultaneous operation of two or more modules, thereby enhancing the quality of the mobile device and minimizing any undesirable impact upon the human body.

8 Claims, 4 Drawing Sheets

[1ST CHARGING FREQUENCY]

[2ND CHARGING FREQUENCY]

[a]

(RELATED ART)

[b]

METHOD AND APPARATUS FOR REDUCING ELECTROMAGNETIC WAVES IN MOBILE DEVICE

PRIORITY

This application claims the benefit under 35 U.S.C. §119 (a) of a Korean patent application filed on Aug. 22, 2011 in the Korean Intellectual Property Office and assigned Serial No. 10-2011-0083419, the entire disclosure of which is hereby incorporated by reference.

BACKGROUND OF THE INVENTION

1. Field of the Invention

The present invention relates to a method and an apparatus for reducing electromagnetic waves in a mobile device. More particularly, the present invention relates to preventing the magnitude of electromagnetic waves from exceeding a maximum when two or more modules are operating together in the mobile device.

2. Description of the Related Art

Nowadays, mobile devices such as mobile phones or portable terminals are widely used due to their convenience and portability. Normally, such a mobile device provides a great variety of functions such as a voice call, a video call, a short message service, a camera, a music player, a digital broadcasting service, an e-mail service, a location based service, and the like. In order to realize such functions, a mobile device has a plurality of modules.

Each module of a mobile device produces electromagnetic waves while operating. Since electromagnetic waves have an undesirable impact upon the human body, mobile devices are regulated so as not to produce electromagnetic waves having a magnitude that exceeds a maximum level as established by industry standards. However, a mobile device is designed to suppress the occurrence of electromagnetic waves in excess of the standards in view of the activation of each module individually. Therefore, when two or more modules are operating at the same time, a mobile device may often produce electromagnetic waves in excess of the standards due to mixing or interference of different frequencies used in respective modules. For instance, when a camera module is used a charger module is operating, a mobile device of the related art may produce electromagnetic waves in excess of the standards.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for reducing electromagnetic waves in a mobile device such that a magnitude of electromagnetic waves produced by the mobile device can be prevented from exceeding a maximum level as established by industry standards when two or more modules are operating simultaneously.

According to an aspect of the present invention, a method for reducing electromagnetic waves in a mobile device that includes at least a first module and a second module having different functions is provided. The method includes operating the first module at a first operating frequency, when there is a request for operating the second module while the first module is operated, changing the first operating frequency to a second operating frequency which is different from the first operating frequency, and operating the first module at the second operating frequency.

According to another aspect of the present invention, a method for reducing electromagnetic waves in a mobile device that includes at least a charger module and a camera module is provided. The method includes charging, by the charger module, a battery at a first charging frequency, determining whether a camera mode is activated during the charging of the battery, if the camera mode is activated, changing the first charging frequency to a second charging frequency which is different from the first charging frequency, and charging the battery at the second charging frequency.

According to still another aspect of the present invention, an apparatus for reducing electromagnetic waves in a mobile device that includes at least a first module and a second module having different functions is provided. The apparatus includes a control unit for controlling the first module to change a first operating frequency of the first module to a second operating frequency that is different from the first operating frequency when there is a request for operating the second module while the first module is operated at the first operating frequency.

Aspects of the present invention may reduce electromagnetic waves caused by a simultaneous operation of two or more modules, thereby enhancing the quality of a mobile device and also minimizing any undesirable impact upon the human body.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A mobile device is a kind of electronic device that has a plurality of modules. A mobile device may be a mobile communication terminal, a Personal Digital Assistant (PDA), a smart phone, a tablet Personal Computer (PC), a Portable Multimedia Player (PMP), and the like. When two or more modules of the mobile device are operated at the same time, the mobile device may produce electromagnetic waves having a total magnitude that exceeds a maximum as established by industry standards due to mixing or interference of different operating frequencies used in the respective modules. In order to address the above problem, an exemplary mobile device of the present invention has features of preventing the occurrence of electromagnetic waves in excess of the standards by changing the operating frequency of the first module when the second module is operated during the operation of the first module. In an exemplary embodiment described below, a mobile communication terminal, a charger module, and a camera module will be used as examples of the mobile device, the first module, and the second module, respectively. However, it is to be understood that the mobile communication terminal, the charger module, and the camera module are used merely for example and not intended to limit application of the present invention.

Figure 1:
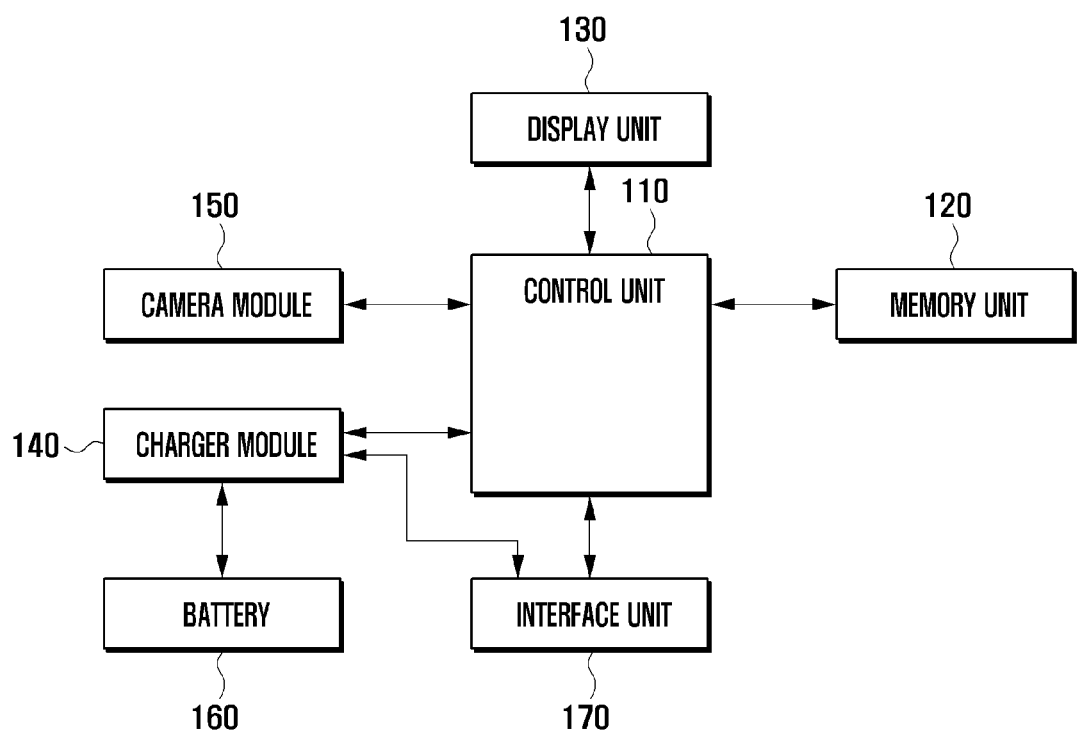
FIG. 1 is a block diagram illustrating the configuration of a mobile device in accordance with an exemplary embodiment of the present invention.
Figure 2:
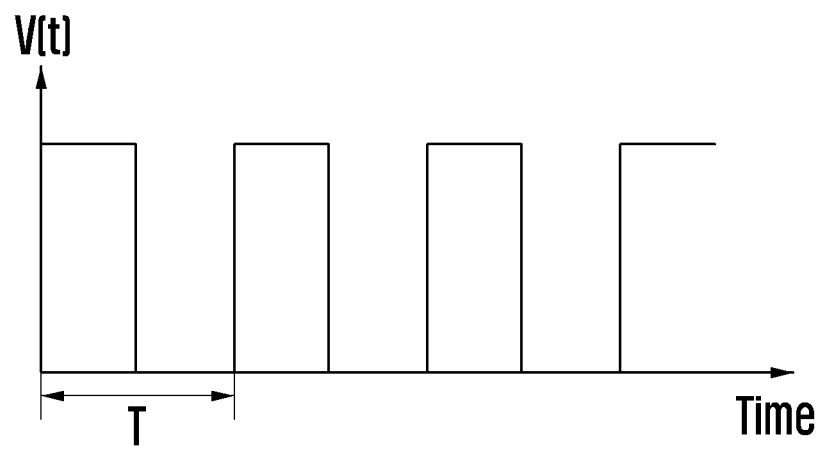
FIG. 2 is a view illustrating a change of charging frequency in a charger module in accordance with an exemplary embodiment of the present invention.
Figure 2:
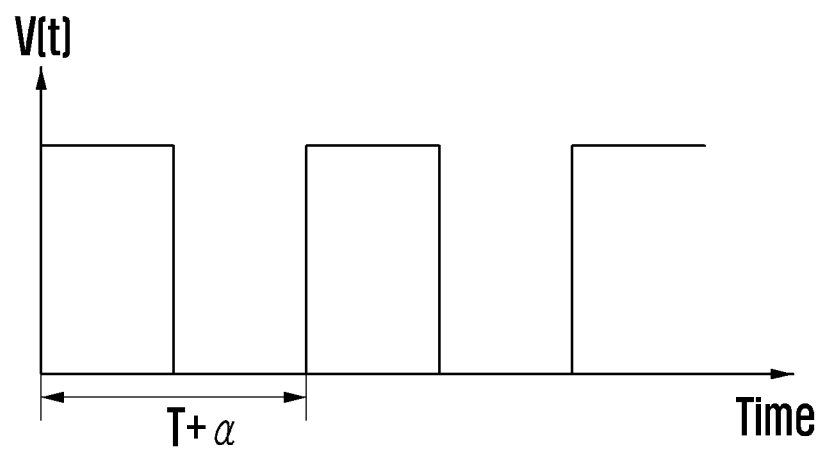

FIG. 1 is a block diagram illustrating the configuration of a mobile device in accordance with an exemplary embodiment of the present invention, and FIG. 2 is a view illustrating a change of charging frequency in a charger module in accordance with an exemplary embodiment of the present invention.

Referring to FIGS. 1 and 2, a mobile device 100 may include an interface unit 170, a battery 160, a camera module 150, a charger module 140, a display unit 130, a memory unit 120, and a control unit 110.

The display unit 130 displays information, including various menus of the mobile device 100, input by a user or offered to a user. For instance, the display unit 130 may visually offer a variety of screen views in connection with the use of the mobile device 100, such as an idle screen, a menu screen, a message writing screen, a call screen, and the like. More particularly, the display unit 130 may display a specific page that indicates a change of charging frequency of the charger module 140 when the camera module 150 is operated during a charging of the battery 160. For instance, the display unit 130 may represent a predetermined graphical icon in the indicator area that usually shows the residual quantity of the battery 160, the received signal strength, or the like. Alternatively, the display unit 130 may output a pop-up window for a given time (e.g., one second) to indicate a change of charging frequency of the charger module 140. The display unit 130 may be formed of a Liquid Crystal Display (LCD), Organic Light Emitting Diodes (OLED), an Active Matrix OLED (AMOLED), or any other equivalent. If the display unit 130 is formed of a touch screen, the display unit 130 may also act as an input unit (not shown).

The interface unit 170 allows a connection of an external device such as a Universal Serial Bus (USB) data cable, a USB charge cable, a travel adaptor, an earphone, or the like. More particularly, the interface unit 170 may be connected to a charging device (e.g., a USB charge cable, a travel adaptor, etc.) used for charging the battery 160.

The charger module 140 charges the battery 160, using power supplied through a charging device connected to the interface unit 170. In an exemplary implementation, the charger module 140 can change the charging frequency for charging of the battery 160. More specifically, the charger module 140 charges the battery 160 at a first charging frequency in a normal state and, when the camera module 150 is operated during the battery charging, begins to charge the battery 160 at a second charging frequency. Namely, depending on whether the camera module 150 is operated, the charger module 140 suitably changes the charging frequency under the control of the control unit 110. For instance, if the charger module 140 uses a Pulse Width Modulation (PWM) technique, the charger module 140 can change the charging frequency by modifying a pulse width as shown in FIG. 2. More specifically, the charger module 140 charges the battery 160 according to a pulse having a given width T in a normal state, and charges the battery 160 according to a pulse having an increased width T+α in response to use of the camera module 150. Such modification of pulse width is, however, exemplary only and not to be considered as a limitation of the invention. In another exemplary embodiment, a pulse width may be decreased during use of the camera module 150.

The battery 160 produces an electric current to be supplied to elements of the mobile device 100. Normally, the battery 160 is a secondary battery (i.e., a rechargeable battery) including a nickel battery, a cadmium battery, a Nickel Cadmium (NiCd) battery, a Nickel Metal Hydride (NiMH) battery, a Lithium ion (Li-ion) battery, a Lithium ion polymer (Li-ion polymer) battery, or any chemical cell. Since the battery 160 is understood by those skilled in the art, a detailed description will be omitted herein. In an exemplary embodiment of the invention, the battery 160 may be charged at the first charging frequency in a normal state and also be charged at the second charging frequency during use of the camera module 150.

The camera module 150 captures a still image or records a video. Normally, the camera module 150 may be operated at the operating frequency of 12 MHz~48 MHz. This operating frequency may include a Main CLocK (MCLK) and a Peripheral CLocK (PCLK). The camera module 150 may include an image sensor and an image processor. The image sensor, such as a Complementary Metal Oxide Semiconductor (CMOS) image sensor or a Charge Coupled Device (CCD) image sensor, converts an optical image into an electric signal. The image processor performs a series of image processing tasks, such as resizing, Red Green Blue (RGB) signal transformation, Analog/Digital (A/D) conversion, noise reduction, digital zoom, rotation, encoding, and the like with respect to a signal input from the image sensor. Since the image sensor and the image processor are understood by those skilled in the art, a detailed description will be omitted herein.

The memory unit 120 may store programs and data required for operations of the mobile device 100, including an Operating System (OS) for the mobile device 100 and applications for executing various optional functions of the mobile device 100, such as a sound reproduction, an image or video playback, and the like. More particularly, the memory unit 120 may store a specific application that changes, depending on whether the camera module 150 is operated, the charging frequency of the charger module 140.

The control unit 110 controls operations of the mobile device 100 and controls signal flows between internal blocks of the mobile device 100. More particularly, the control unit 110 may suitably change the charging frequency of the charger module 140 in a charge mode, depending on whether the camera module 150 is operated. For this, the control unit 110 may determine whether the interface unit 170 is connected to any charging device (e.g., a USB charge cable, a travel adaptor, etc.). If a connection of a charging device is recognized, the control unit 110 may control the charger module 140 to charge the battery 160 at the first charging frequency (i.e., a default charging frequency). The control unit 110 may determine whether the camera module 150 is operated while the mobile device 100 is in a charge mode. If the camera module 150 is operated, the control unit 110 may transmit a control signal to the charger module 140 such that the charger module 140 changes the charging frequency to the second charging frequency. This is for preventing the occurrence of electromagnetic waves (e.g., radiated emission) in excess of the industry standards due to mixing or interference of the first charging frequency and the operating frequency of the camera module 150. Namely, it is desirable that the second charging frequency does not cause a mixing or interference with the operating frequency of the camera module 150 or, if a mixing or interference is caused, that the second charging frequency is set to any frequency that does not cause electromagnetic waves more than the maximum established by the standards. When the camera module 150 is not operated, the control unit 110 may control the charger module 140 to again charge the battery 160 at the first charging frequency. Namely, in response to the non-operation of the camera module 150, the control unit 110 may control the charger module 140 to restore the charging frequency from the second frequency to the first frequency.

Although not illustrated in FIG. 1, the mobile device 100 of this invention may essentially or selectively include any other elements such as a radio frequency module, a short range communication module, a broadcast receiving module, a digital sound play module such as an MP3 module, an internet access module, and the like. According to a digital convergence tendency, such elements may be varied, modified and improved in various ways, and any other elements equivalent to the above elements may be additionally or alternatively equipped in the mobile device 100. Meanwhile, as will be understood by those skilled in the art, some of the above-mentioned elements in the mobile device may be omitted or replaced with another.

Figure 3:
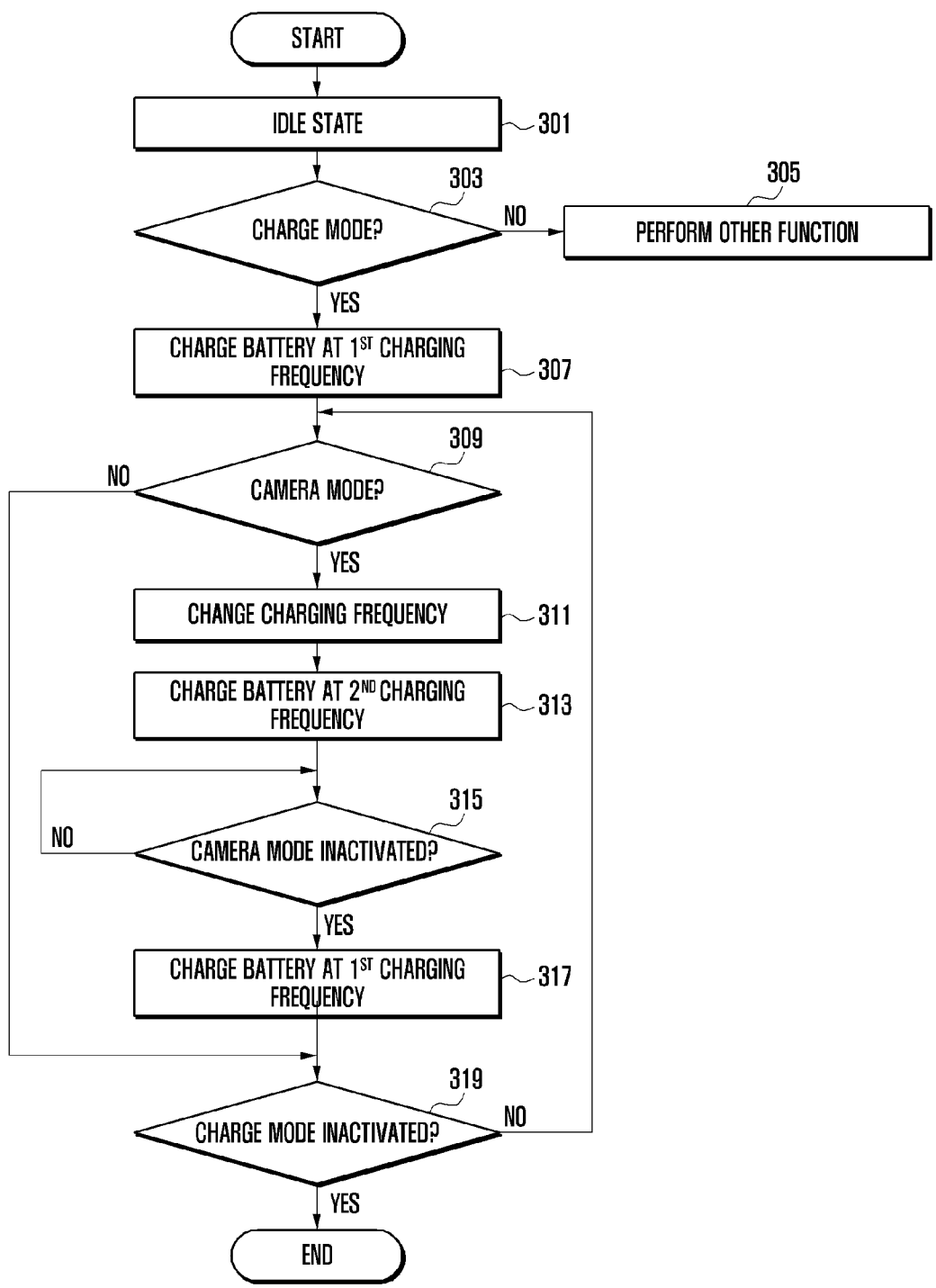
FIG. 3 is a flowchart illustrating a method for reducing electromagnetic waves in a mobile device in accordance with an exemplary embodiment of the present invention.

FIG. 3 is a flowchart illustrating a method for reducing electromagnetic waves in a mobile device in accordance with an exemplary embodiment of the present invention.

Referring to FIGS. 1 to 3, the control unit 110 may be in an idle state at step 301. The control unit 110 may determine whether a charge mode is activated at step 303. The charge mode may be activated when the interface unit 170 is connected to any charging device (e.g., a USB charge cable, a travel adaptor, etc.). For this, the control unit 110 may have or be connected to General Purpose Input/Output (GPIO) terminals or interrupt terminals used to monitor a connection of a charging device.

If it is determined at step 303 that the charge mode is not activated, the control unit 110 may perform any other selected function at step 305. For instance, the control unit 110 may maintain the idle state or, in response to a user's request, perform a music play function, a video playback function, a call function, or the like. If it is determined at step 303 that the charge mode is activated, the control unit 110 may control the charger module 140 to charge the battery 160 at the first charging frequency, i.e., at a default charging frequency at step 307. Namely, the control unit 110 may send, to the charger module 140, a control signal that instructs the charger module 140 to charge the battery 160 at the first charging frequency. This control signal may be transmitted via an Inter-Integrated Circuit (I2C) bus, for example.

Further, the control unit 110 may determine whether the camera module 150 is operated in the charge mode at step 309. If it is determined at step 309 that the camera module 150 is not operated, the control unit 110 may perform step 319 to be described below. If it is determined at step 309 that the camera module 150 is operated, the control unit 110 may change the charging frequency of the charger module 140 to the second charging frequency at step 311. As discussed above, it is desirable that the second charging frequency does not cause a mixing or interference with the operating frequency of the camera module 150 or, if a mixing or interference is caused, it is desirable that the second charging frequency is set to any frequency that does not cause electromagnetic waves to have a total magnitude in excess of the maximum as established by the industry standards. For instance, if the camera module 150 operates at 24 MHz, the second charging frequency may be set to 22 MHz or 26 MHz, which is exemplary only and not to be considered as a limitation of this invention. In most cases, the second charging frequency may be selected, through designer's experiments, as a specific frequency that causes the least electromagnetic waves when the camera module 150 and the charger module 140 are working simultaneously.

After the charging frequency is changed at step 311, the control unit 110 may control the charger module 140 to charge the battery 160 at the second charging frequency at step 313. Thereafter, the control unit 110 may determine whether the camera mode is inactivated at step 315. If it is determined at step 315 that the camera mode is not yet inactivated, the control unit 110 may maintain step 315. When it is determined at step 315 that the camera mode is inactivated, the control unit 110 may control the charger module 140 to again charge the battery 160 at the first charging frequency at step 317. Namely, in response to the non-operation of the camera module 150, the control unit 110 may restore the charging frequency of the charger module 140 from the second frequency to the first frequency.

Further, the control unit 110 may determine whether the charge mode is inactivated at step 319. If it is determined at step 319 that the charge mode is not yet inactivated, the control unit 110 may return to step 309 and repeat the above process. When it is determined at step 319 that the charge mode is inactivated, the control unit 110 may stop the operation of the charger module 140 and enter into the idle state.

Although in the above discussed exemplary embodiment, the control unit 110 changes the charging frequency of the charger module 140 in response to the operation of the camera module 150 in the charge mode, the present invention is not so limited. Alternatively, the control unit 110 may temporarily stop the operation of the charger module 140 when the camera module 150 is operated in the charge mode.

Figure 4:
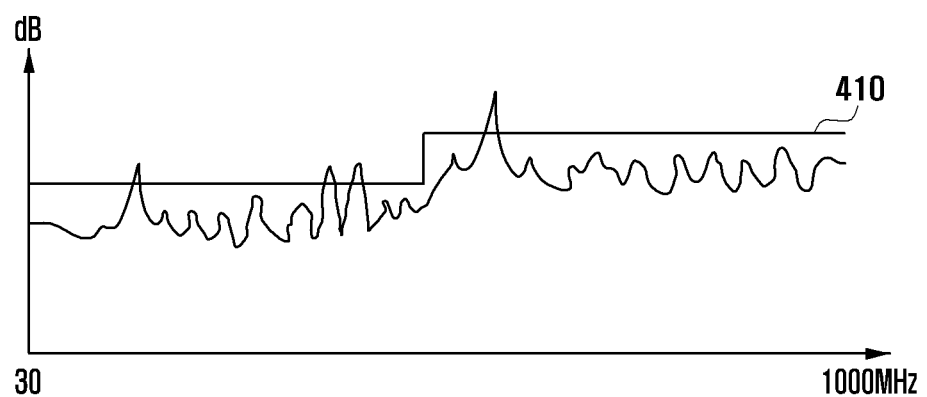
FIG. 4 is a graph illustrating the results of measuring electromagnetic waves in a mobile device of the related art and in a mobile device in accordance with an exemplary embodiment of the present invention.
Figure 4:
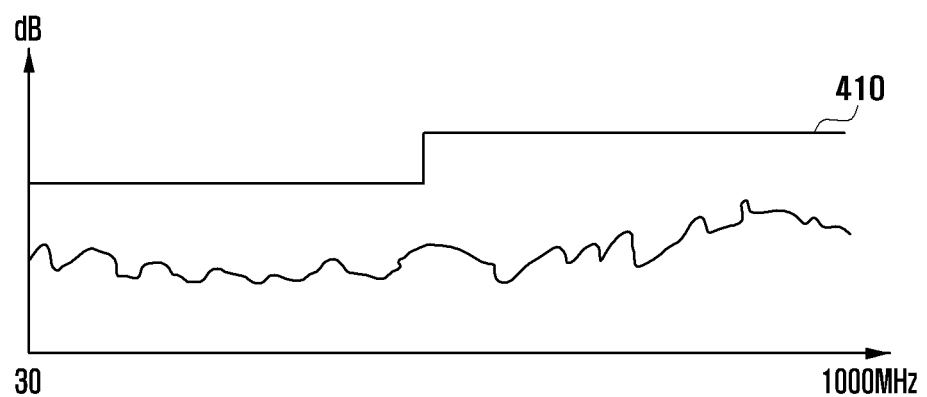

FIG. 4 is a graph illustrating the results of measuring electromagnetic waves in a mobile device of the related art and in a mobile device in accordance with an exemplary embodiment of the present invention.

Referring to FIGS. 1 to 4, the first graph (a) shows the results of measuring electromagnetic waves (i.e., radiated emission) without changing the charging frequency of the charger module 140 as in a mobile device of the related art when the camera module 150 and the charger module 140 are in operation together. Further, the second graph (b) shows the results of measuring electromagnetic waves (i.e., radiated emission) after changing the charging frequency of the charger module 140 according to the above-discussed exemplary embodiment when the camera module 150 and the charger module 140 are in operation together. In these graphs (a) and (b), reference numeral 410 indicates the acceptable maximum of radiated emission according to industry standards. As shown in the first graph (a), a mobile device of the related art sometimes produces radiated emission in excess of the maximum. In contrast, as shown in the second graph (b), the mobile device 100 according to the above-discussed exemplary embodiment does not produce radiated emission in excess of the standards.

It will be understood that the above-discussed exemplary method for reducing electromagnetic waves in a mobile device can be implemented by computer program instructions. These computer program instructions can be provided to a processor of a general purpose computer, a special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks. And, each block of the flowchart illustrations may represent a module, segment, or portion of code, which comprises one or more executable instructions for implementing the specified logical function(s). It should also be noted that in some alternative exemplary implementations, the functions noted in the blocks may occur out of order. For example, two blocks shown in succession may in fact be executed substantially concurrently or the blocks may sometimes be executed in the reverse order, depending upon the functionality involved.

Although the above-discussed embodiment of the present invention is the case where the camera module and the charger module are in operation together, this is exemplary only and not to be considered as a limitation of the invention. This invention may be effectively applied to any other cases in which at least any first and second modules are operated together and thus cause electromagnetic waves in excess of the industry standards. That is, if there is any request for operating a second module while a first module is operating at a first operating frequency, this invention may change the operating frequency of the first module so as not to cause electromagnetic waves in excess of the standards.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for reducing electromagnetic waves in a mobile device that includes at least a first module having a first function and a second module having a second function that is different from the first function, the method comprising:
   operating the first function of the first module at a first operating frequency;
   if there is a request for operating the second function of the second module while the first function of the first module is being operated, changing the first operating frequency of the first function to a second operating frequency which is different from the first operating frequency; and
   operating the first function of the first module at the second operating frequency, which is different from an operating frequency for operating the second function of the second module,
   wherein the second operating frequency is selected such that a total magnitude of electromagnetic waves generated by the first module and the second module does not exceed a threshold value.

2. The method of claim 1, further comprising:
   when the second module stops operating while the first module is being operated at the second operating frequency, operating the first module at the first operating frequency.

3. The method of claim 1, wherein the second operating frequency is at least one of a selected frequency that does not cause a mixing or interference with the operating frequency of the second module.

4. The method of claim 1, wherein the operating of the first module at the first operating frequency comprises operating the first module using a Pulse Width Modulation (PWM) technique.

5. The method of claim 4, wherein the changing of the first operating frequency to the second charging frequency comprises modifying a pulse width.

6. An apparatus for reducing electromagnetic waves in a mobile device that includes at least a first module having a first function and a second module having a second function that is different from the first function, the apparatus comprising:
   a control unit configured to control a change of a first operating frequency of operating the first function of the first module to a second operating frequency of operating the first function of the first module that is different from the first operating frequency, if there is a request for operating the second module while the first module is being operated at the first operating frequency,
   wherein the second operating frequency is different from an operating frequency for operating the second function of the second module and is selected such that a total magnitude of electromagnetic waves generated by the first module and the second module does not exceed a threshold value.

7. The apparatus of claim 6, wherein the control unit is further configured to change the second operating frequency of the first module to the first operating frequency, when the second module stops operating while the first module is being operated at the second operating frequency.

8. The apparatus of claim 6, wherein the second operating frequency is at least one of a selected frequency that does not cause a mixing or interference with the operating frequency of the second module.

* * * * *